UNITED STATES PATENT OFFICE.

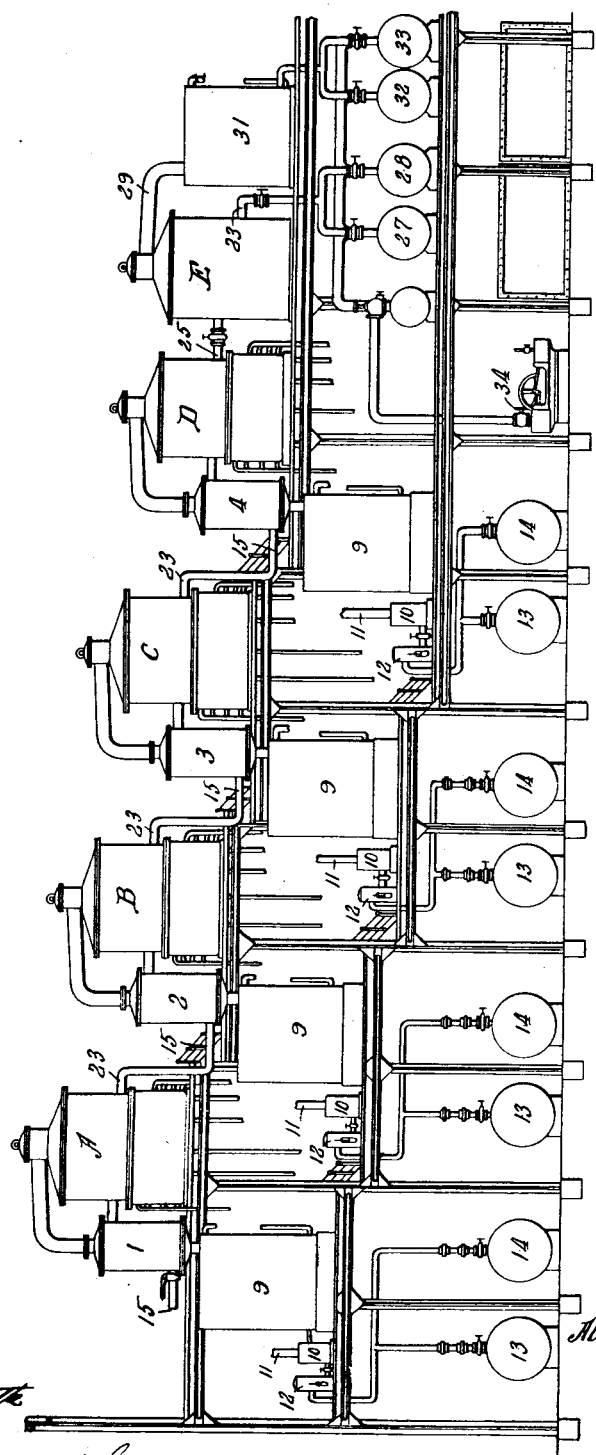

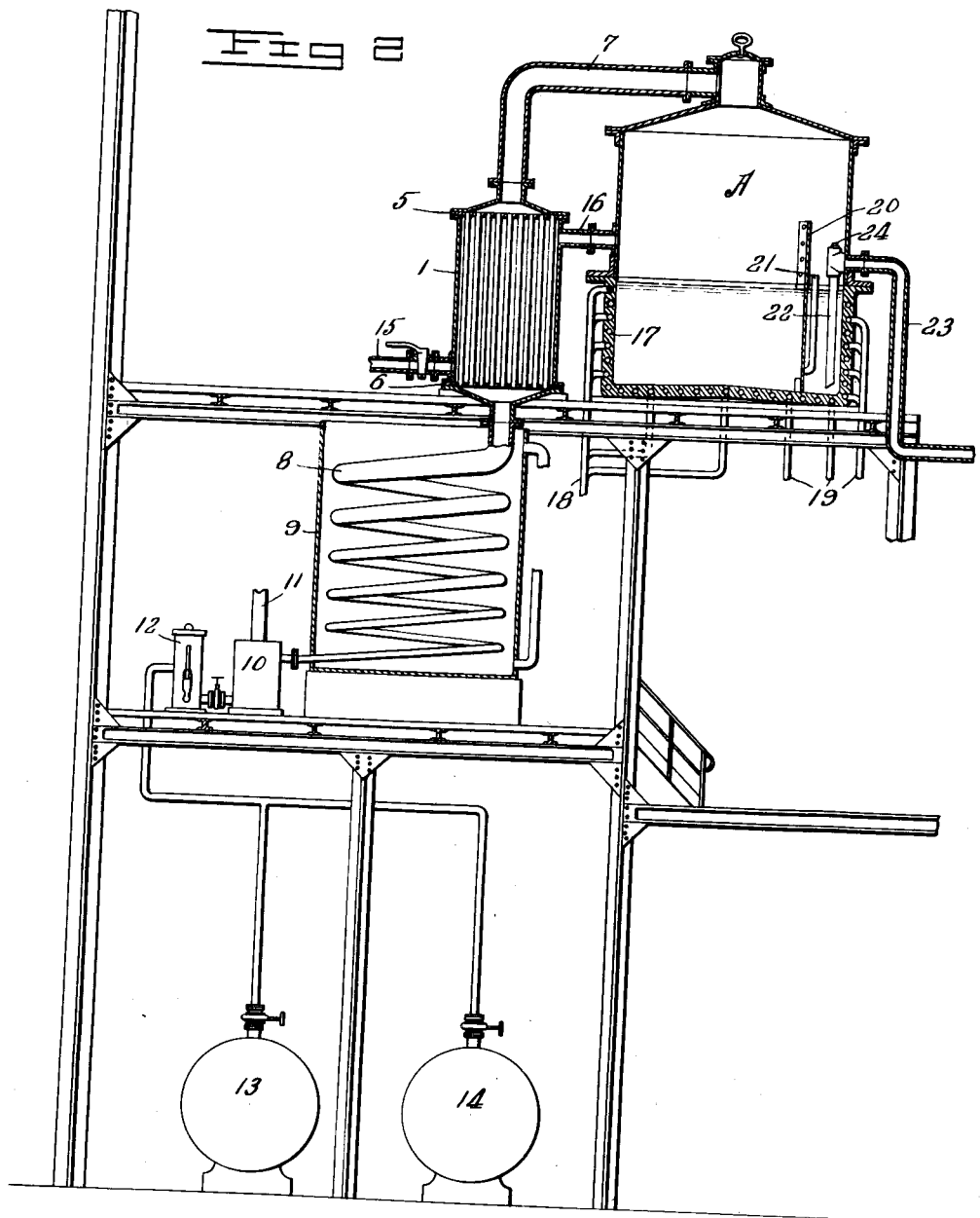

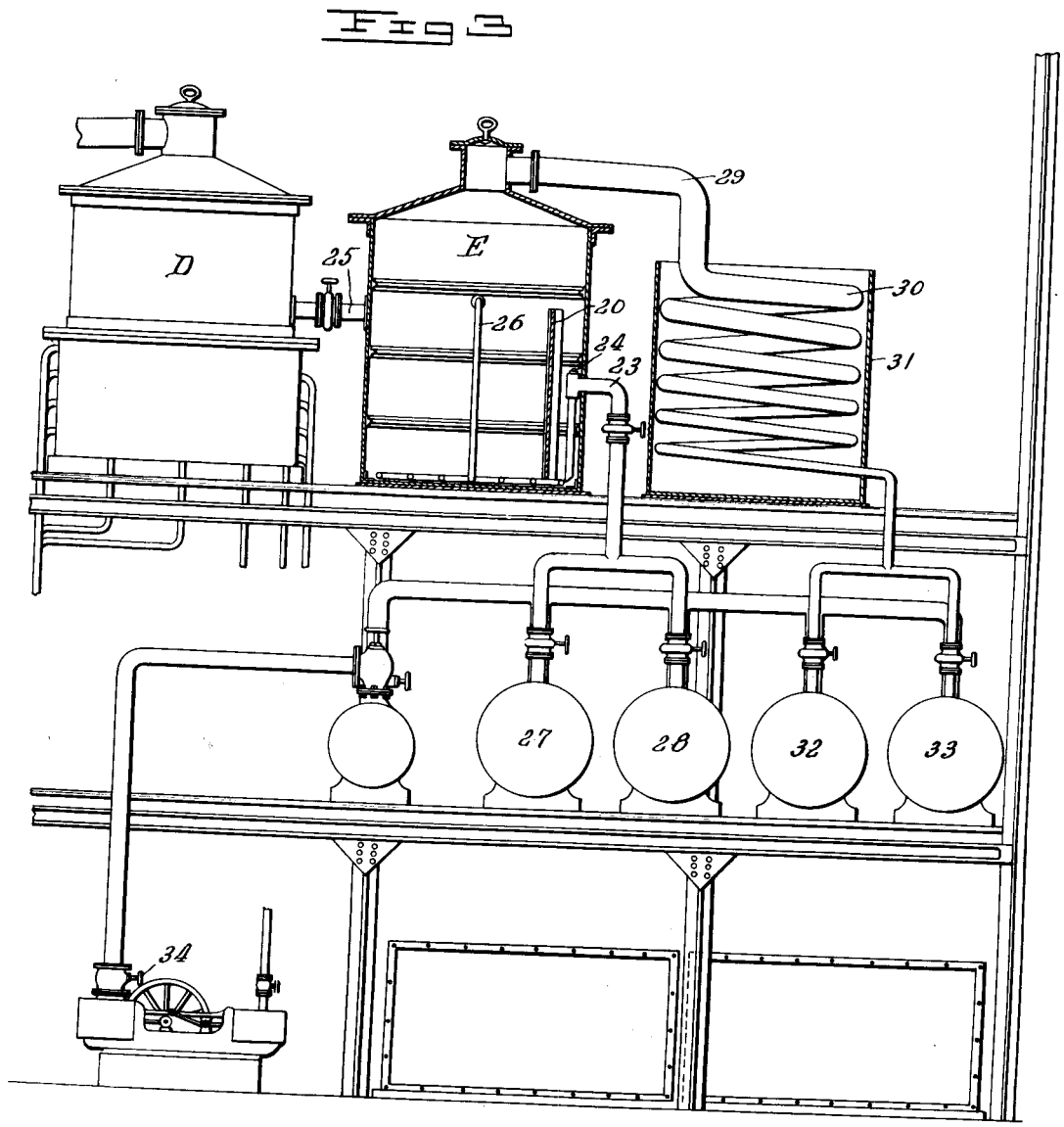

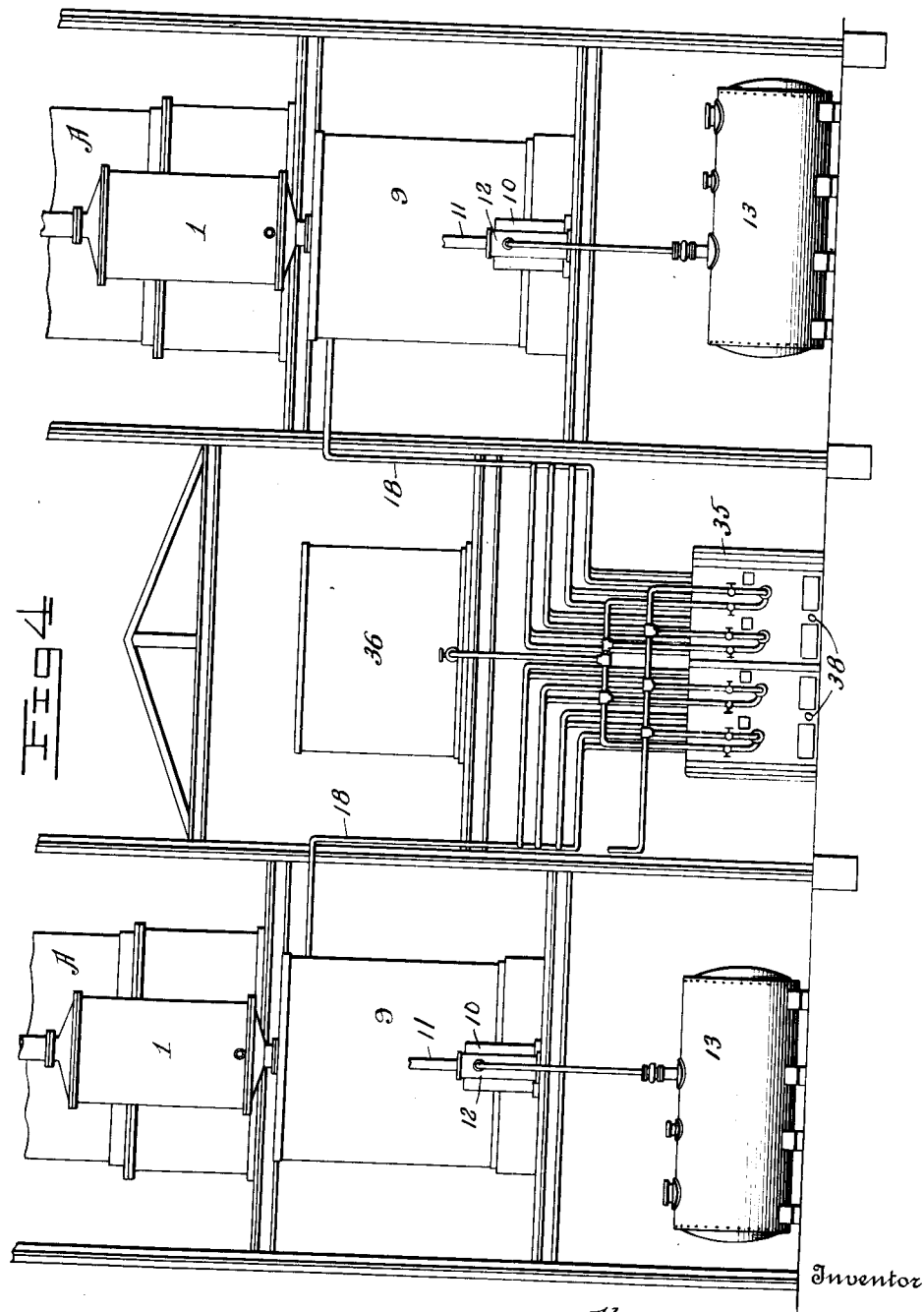

ALEXANDER LACKMAN, OF NEW YORK, N. Y.

APPARATUS FOR DISTILLING MINERAL OILS.

1,171,524.  Specification of Letters Patent.  Patented Feb. 15, 1916.

Application filed April 4, 1912. Serial No. 688,377.

*To all whom it may concern:*

Be it known that I, ALEXANDER LACKMAN, a citizen of Germany, residing at New York, in the county of New York and State of New York, have invented certain new and useful Improvements in Apparatus for Distilling Mineral Oils, of which the following is a specification.

This invention relates to apparatus for distilling mineral oils; and it comprises as an organization of apparatus elements, a succession of stills with means for feeding oil progressively through the series and means for recovering volatile products evolved in each such still, each such preceding still being provided with draw off means for feeding the next succeeding still with oil which has been exhausted of volatiles at the prevailing temperature in such preceding still and each succeeding still being provided with means for equalizing the temperature between inflowing oil and outflowing vapors; all as more fully hereinafter set forth and as claimed.

In the distillation of mineral oils little attention has been paid to the matter of economy of heat and to the matter of securing clean definite distillates in the first instance, it being customary to use simple furnace heated charge stills, that is, stills which are not fed continuously but operate on a charge of crude oil. With such a charge still, all fractions of the oil are successively produced in the same still, the temperature being raised as the distillation proceeds. And the still is not kept at a definite temperature throughout its body at any given stage in the distillation, being on the contrary usually unevenly heated. This uneven temperature, which is incident to direct firing, is usually relied upon to produce more or less cracking of the oil. Cracking is a breaking down of the oil molecule and while it increases the amount of low boiling products these are ill-smelling because of the presence of unsaturated hydrocarbons. The body of the still, or the portion which contains the oil is raised to a comparatively high heat for this purpose while some condensation, with a back drip, is allowed to occur in the still head. This returns high-boiling portions for reheating and incident cracking.

In the present invention I have rearranged conditions so as to secure mainly simple distillation in continuous operation with a maximum economy of heat and with a precise temperature adjustment in each stage of distillation. To this end, I provide a plurality of stills arranged in series, each such still being provided with heating means to maintain it at an even heat within a definite, rather narrow temperature range. This heating may be accomplished by superheated water or by superheated steam. As many such stills may be provided as there are fractions to be secured. Each such still is provided with its own condensing means. In operation, the oil is fed successively through the series, being maintained in each still until it is thoroughly freed from the fractions to be evolved therein and being fed to the next successive still only when exhausted of such fractions. For this purpose, each such still is so arranged as to maintain within it a sort of "dominant pool" of oil at all times, the constant feed thereto and the constant withdrawals therefrom being, comparatively to the mass of oil, in minor amount. The ingoing oil is introduced at nearly the still temperature and so that it enters at the top of the pool whereon it tends to float while undergoing distillation while the outgoing oil is drawn from the bottom. In order to insure this action, I divide the still into compartments or sections by a wall or septum rising above the normal level of the oil, introducing fresh oil on one side of the septum in one compartment and withdrawing oil on the other side from the other compartment. The first compartment is made the larger and communication between the two is by a conduit opening at the bottom of the oil pool in the larger compartment and delivering at the top of the oil body or pool in the smaller compartment so that the less perfectly exhausted oil from the former may float on the heavier oil in the latter. This gives me two treatments in the same still.

The exhausted oil drawn off from the bottom of the oil body in the smaller compartment is at a lower temperature than prevails in the next succeeding still while it is desirable that it should be, as nearly as possible, delivered thereto at the temperature prevailing therein. It is, of course, desirable that it shall float on the hot oil in the recipient still and be not cold enough to be of the same or greater density. For this reason, and also to secure an economy of heat, in lieu of transmitting the oil directly from the one still to the other, I pass it through a heat-interchanger connected to the vapor outlet of the recipient still. Therein it absorbs the heat of the vapors and it is brought nearly to the temperature of ebullition in the recipient still which, in the present invention, will be nearly the still temperature. Incidentally, this operation economizes heat by taking the heat of the outgoing vapors and delivering it to incoming oil while a useful condensing effect on the vapors is also secured. Beyond the heat-interchanger in the path of the vapors from each still may be the usual condensing arrangements.

In the accompanying illustration I have shown, more or less diagrammatically, an assemblage of apparatus elements within the present invention.

In this showing, Figure 1 is a view in elevation showing an assemblage of five stills with accessory parts for treating high grade crude oils having a paraffin base; Fig. 2 is a detail sectional view on a larger scale of one of the stills of Fig. 1; Fig. 3 is a smaller view of the final still of the assemblage of Fig. 1; Fig. 4 is a detail view showing heating and other connections of the structure of Fig. 1.

In the structure of Fig. 1, five stills are shown in an assemblage particularly intended for the treatment of petroleum oil. In working upon asphalt, the system will need some modification in the final still and it is not usually desirable to have as many stills in series. In the showing of Fig. 1, elements A, B, C, and D are the preliminary stills in the series and E is a final or finishing still.

The detail showing of Fig. 2 may be taken as representing the structure of A, B, C, or D and that of Fig. 3 as representing the structure of E as used for high grade crude oils having a paraffin base.

In the showing of Fig. 1, the first four stills A, B, C and D are mounted on successively lower levels and each is provided with a heat - interchanging condenser, marked, respectively 1, 2, 3 and 4. Referring now particularly to Fig. 2, this interchanger consists of a nest of tubes between cross-headers 5 and 6. These tubes are in open communication with vapor lead 7 from the still and condenser 8, shown as a coil in cooling tank 9. Condensed vapors pass gas-liberator 10 having outlet 11 for permanent gases and go thence through hydrometer casing 12 to the receiver 13 or 14. Oil for the still is delivered through valved inlet 15 into the chamber around the tubes and goes thence through 16 at a comparatively high level into the body of the still. The still as shown, for the sake of securing an absolutely uniform temperature, may be provided with heating coils 17, cast into the body of the still. For this purpose, the lower portion may be of cast iron. The coils can also be simply set in the lower part and along the sides of the still chambers and the lower portion of the stills can then be of steel plates. As shown, these coils are fed in parallel with superheated water from 18 and discharged in parallel through 19. Superheated steam may be employed but the method of heating shown is convenient and is advantageous, giving a fixed and uniform temperature; something which is highly advantageous in the present invention, as the temperature of the superheated water may be regulated mechanically by a pressure regulator with a safety valve. Across the body of the still, dividing it into two portions, larger and smaller, is a partition 20. As shown, this extends for some distance above the normal oil level within the still. At a point near its bottom, it is provided with an orifice continued as conduit 21 rising to a point near the top of the oil level. Dipping into the body of oil in the smaller compartment is conduit 22 extending to near the base of the same and removing oil for discharge through 23. To provide against siphoning, there may be an orifice at the top 24 of this assemblage. The structure just described is the same in stills A, B, C and D.

In handling petroleum oil, the crude oil which contains gasolene, benzin, and the heavier products, is run into A where it is kept at a uniform temperature to free it of gasolene, say, 160 to 175° F. As the incoming oil exchanges heat with the outgoing vapors, it enters the still moderately heated and at nearly the still temperature; something which is very important. The incoming current of oil containing light constituents is of less specific gravity than the body of oil already in the still and therefore tends to float thereon, if at the same temperature, but if at a materially less temperature this difference in specific gravity may disappear or be reversed. The oil in the still is in a comparatively large mass and this incoming warmed oil, which contains the lighter constituents, is lighter than the oil already in the still and therefore tends to float on it until freed of such lighter constituents. The mass of liquid in the still forming, so to speak, a "dominant pool", receives the light incoming material. It is, of course, important that the incoming oil shall not be so cold as to equal in density the oil already in the still. This feed is into the larger compartment of the still. Treated oil is withdrawn from the bottom of the large pool or body and discharged into the top layers of the pool or body of the smaller compartment. Outgoing oil, in turn, is withdrawn from the bottom of this smaller pool. The larger compartment may occupy ¼ or ⅚ of the capacity of the still. The second still, B, which may be kept at, say, 300° F., receives the treated material from still A and operates in a similar manner. The outgoing vapors preheat the incoming oil. In the third still, or C, the temperature may be about 400° F. In this still, the kerosene is obtained. In D at about 500° F. or more may be obtained the lighter spindle oils or heavy burning oils.

Still E is of somewhat different construction from the stills just described. In it, the residual oil is distilled with superheated steam, or with steam and vacuum, as the case may be. Oil enters from D through inlet 25. This still is shown as provided with steam inlet 26. Like the stills just described, it is separated by a cross partition into larger and smaller compartments. Residual oil is removed by a similar device to that already described, but instead of going to another still, it may be directed into receiver 27 or 28. The vapors formed in this still which may be paraffin oil (that is, oil for making paraffin and clear lubricating oil) go through outlet 29 and condenser 30 in tank 31 into receiver 32 or 33. Pump 34 may be used for producing vacuum.

As it is generally desirable not to have the heating arrangement in the same building as the stills, for the sake of economy of space, the same heating means may be employed to run two parallel sets of stills in buildings on either side of the heating plant as shown, more or less diagrammatically, in Fig. 4. In this showing, the heating arrangement is shown for the first two stills of the type of A. Element 35 is a furnace which may be fired with fuel oil from 36 and may also receive the permanent gases from the condensers through 38. In the furnace water is heated in suitable coils (not shown) and goes to the heating coils of the furnace through (18), returning for reheating through pipes not shown in this view.

What I claim is:—

1. In an oil distilling plant, a plurality of stills in series, each such still having individual heating means and vapor removing means, an oil outlet leading from a low point and an oil inlet at a higher point, and means for feeding oil through such series of stills, the oil from each such still being passed into the next succeeding still in heat-receiving relationship to the outgoing vapors from such next succeeding still.

2. In an oil distilling plant, a plurality of stills in series, each such still having individual heating means and vapor removing means, and means for feeding oil through such series of stills, the oil from each such still being passed into the next succeeding still in heat-receiving relationship to the outgoing vapors from such next succeeding still and being passed in at the top of the body of oil in such next succeeding still.

3. In an oil distilling plant, a plurality of stills in series arrangement, each such still being provided with heating means adapted to maintain a fixed temperature therewithin, means for passing oil through the series, such means comprising a feed conduit for each still adapted to deliver oil into such still at the top of a body of oil therein and vapor-removing means for each such still, the vapor-removing means being adapted to impart heat to the oil feed conduit supplying such still.

4. In a still, a still chamber, means for heating said chamber, means for removing vapors therefrom, a vertical partition dividing said chamber into sub-chambers, means for introducing heated oil into one such chamber at a high point, means for removing oil from such sub-chamber at a low point and delivering it into another sub-chamber at a higher point, and oil outlet means for the chamber tapping a sub-chamber at a low point.

5. In a still, a still chamber, means for heating said chamber, means for removing vapors therefrom, a transverse vertical partition extending part way up the chamber and dividing it into sub-chambers of unequal size, means for introducing heated oil into the larger sub-chamber at a high point, means for removing oil near its base and introducing it into the smaller sub-compartment at a higher point and oil outlet means tapping the smaller sub-chamber at a low point.

6. In a still, a still chamber, means for heating said chamber, means for removing vapors therefrom comprising means for imparting the heat of such vapors to ingoing oil, a vertical partition dividing said chamber into sub-chambers, means for introducing oil into one such chamber at a high point, means for removing oil from such sub-chamber at a low point and delivering it into another sub-chamber at a high point and oil outlet means for the chamber tapping a sub-chamber at a low point.

7. In a still, a still chamber, means for heating said chamber, means for removing vapors therefrom comprising means for imparting the heat of such vapors to ingoing oil, a transverse vertical partition extending part way up the chamber and dividing it into sub-chambers of unequal size, means for introducing oil into the larger sub-chamber at a high point, means for removing oil near its base and introducing it into the smaller sub-compartment at a higher point and oil outlet means tapping the smaller sub-chamber at a low point.

In testimony whereof, I affix my signature in the presence of two subscribing witnesses.

AL. LACKMAN.

Witnesses:
LEWIS N. FOOTE,
LILLIAN A. McGLYNN.